(12) United States Patent
Caceres et al.

(10) Patent No.: US 8,302,073 B2
(45) Date of Patent: Oct. 30, 2012

(54) MOVING AND COPYING DEPENDENCIES ALONG WITH SOURCE CODE

(75) Inventors: Ramon Caceres, New York, NY (US); Sebastien Demathieu, Paris (FR)

(73) Assignee: International Business Machines Corporation, Armonk, NY (US)

( * ) Notice: Subject to any disclaimer, the term of this patent is extended or adjusted under 35 U.S.C. 154(b) by 1126 days.

(21) Appl. No.: 11/453,492

(22) Filed: Jun. 15, 2006

(65) Prior Publication Data
US 2007/0294667 A1    Dec. 20, 2007

(51) Int. Cl.
G06F 9/44    (2006.01)
(52) U.S. Cl. ........................................ 717/109
(58) Field of Classification Search ............... 717/101, 717/110, 116, 121, 122, 124, 140, 144, 108, 717/147, 120, 151, 107, 170, 109; 715/217, 715/853; 714/38; 707/104.1
See application file for complete search history.

(56) References Cited

U.S. PATENT DOCUMENTS

| | | | |
|---|---|---|---|
| 5,361,357 A * | 11/1994 | Kionka ........................ | 717/151 |
| 5,485,615 A | 1/1996 | Wennmyr | |
| 5,574,898 A * | 11/1996 | Leblang et al. ........................ | 1/1 |
| 5,854,932 A * | 12/1998 | Mariani et al. ................ | 717/116 |
| 6,195,659 B1 | 2/2001 | Hyatt | |
| 6,263,492 B1 | 7/2001 | Fraley et al. | |
| 6,292,933 B1 | 9/2001 | Bahrs et al. | |
| 6,546,395 B1 | 4/2003 | DeKimpe et al. | |
| 6,665,678 B2 | 12/2003 | Ching Chen et al. | |
| 6,678,716 B1 | 1/2004 | Pronsati, Jr. et al. | |
| 6,678,889 B1 | 1/2004 | Burkett et al. | |
| 6,782,508 B1 | 8/2004 | Bahrs et al. | |
| 6,789,251 B1 | 9/2004 | Johnson | |
| 6,804,682 B1 * | 10/2004 | Kemper et al. ........................ | 1/1 |
| 6,804,686 B1 * | 10/2004 | Stone et al. ........................... | 1/1 |
| 6,938,240 B2 | 8/2005 | Charisius et al. | |
| 6,950,990 B2 | 9/2005 | Rajarajan et al. | |
| 6,966,061 B1 | 11/2005 | Vance et al. | |
| 7,051,036 B2 | 5/2006 | Rosnow et al. | |
| 7,055,130 B2 * | 5/2006 | Charisius et al. ............. | 717/108 |
| 7,080,081 B2 | 7/2006 | Agarwal et al. | |
| 7,127,707 B1 | 10/2006 | Mishra et al. | |
| 7,152,224 B1 * | 12/2006 | Kaler et al. ................... | 717/121 |
| 7,236,974 B2 | 6/2007 | Bhattacharjee et al. | |

(Continued)

FOREIGN PATENT DOCUMENTS

WO    2004092978 A2    10/2004

OTHER PUBLICATIONS

U.S. Appl. No. 11/412,554, filed Apr. 27, 2006, Bhattacharjee et al.

(Continued)

*Primary Examiner* — Tuan Anh Vu
(74) *Attorney, Agent, or Firm* — Yee & Associates, P.C.; William Stock

(57) ABSTRACT

Moving dependencies along with source code is provided. A set of dependencies are identified for the source code in response to a user moving the source code from an origin project to a destination project. A determination is made whether a number of dependencies from the set of dependencies are present in the destination project. The number of dependencies are added to the destination project in response to the number of dependencies being absent in the destination project.

20 Claims, 6 Drawing Sheets

U.S. PATENT DOCUMENTS

| | | | |
|---|---|---|---|
| 7,251,655 | B2 | 7/2007 | Kaler et al. |
| 7,272,818 | B2 | 9/2007 | Ishimitsu et al. |
| 7,328,206 | B2 | 2/2008 | Petculescu et al. |
| 7,370,315 | B1 | 5/2008 | Lovell et al. |
| 7,383,320 | B1 | 6/2008 | Silberstein et al. |
| 7,461,049 | B2 | 12/2008 | Thompson et al. |
| 7,487,436 | B2 | 2/2009 | Aureglia et al. |
| 7,631,014 | B2 | 12/2009 | Bhattacharjee et al. |
| 7,707,566 | B2 | 4/2010 | Grover et al. |
| 7,765,211 | B2 | 7/2010 | Bhattacharjee et al. |
| 7,797,293 | B2 | 9/2010 | Pabla et al. |
| 7,844,570 | B2 | 11/2010 | Netz et al. |
| 7,870,536 | B2 | 1/2011 | Banavar et al. |
| 7,971,198 | B2 | 6/2011 | Almeida |
| 8,037,056 | B2 | 10/2011 | Naicken et al. |
| 8,069,437 | B2 | 11/2011 | Aigner et al. |
| 2002/0087561 | A1 | 7/2002 | Ching Chen et al. |
| 2002/0097253 | A1* | 7/2002 | Charisius et al. .............. 345/700 |
| 2003/0195898 | A1 | 10/2003 | Agarwal et al. |
| 2004/0031015 | A1* | 2/2004 | Ben-Romdhane et al. ... 717/107 |
| 2004/0060036 | A1 | 3/2004 | Natori et al. |
| 2004/0205066 | A1 | 10/2004 | Bhattacharjee et al. |
| 2004/0220972 | A1 | 11/2004 | Bhattacharjee et al. |
| 2005/0005261 | A1 | 1/2005 | Severin |
| 2005/0034098 | A1 | 2/2005 | DeSchryver et al. |
| 2005/0166094 | A1* | 7/2005 | Blackwell et al. .............. 714/38 |
| 2005/0278709 | A1 | 12/2005 | Sridhar et al. |
| 2006/0020619 | A1 | 1/2006 | Netz et al. |
| 2006/0190503 | A1 | 8/2006 | Naicken et al. |
| 2006/0206496 | A1 | 9/2006 | Aureglia et al. |
| 2006/0218538 | A1 | 9/2006 | van Kesteren |
| 2007/0094607 | A1 | 4/2007 | Morgan et al. |
| 2007/0288883 | A1 | 12/2007 | Soroker et al. |
| 2007/0294667 | A1 | 12/2007 | Caceres et al. |
| 2008/0263511 | A1 | 10/2008 | Shapiro |

OTHER PUBLICATIONS

Randell et al., "Visual Studio 2005: Bridge the Gap Between Development and Operations with Whitehorse", msdn magazine, pp. 1-9, retrieved Apr. 19, 2006 http://msdn.microsoft.com/msdnmag/issues/04/07/Whitehorse.

Williams, "An Overview of Microsoft's Whitehorse", Mar. 23, 2004, retrieved Apr. 19, 2006. http://www.developer.com/net/cplus/print.php/3329641.

"Rational Application Developer for WebSphere Software—Comprehensive Eclipse-based rapid application development for software developers", IBM, pp. 1-2, retrieved Apr. 19, 2006 http://www.ibm.com/software/awktools/developer/application.

Eclipse website, retrieved Apr. 19, 2006 http://www.eclipse.com.

Beck, "D44 Table Partitioning Fundamentals", IBM Corporation 2005, DB2 Information Management Technical Conference, Orlando Florida, Sep. 2005, pp. 1-43.

Chen et al., "Distributed Dynamic Scheduling of Composite Tasks on Grid Computing Systems", 2002 IEEE, pp. 88-97.

Gensel et al., "Integrating Constraints, Composite Objects and Tasks in a Knowledge Representation System", 1993, IEEE, pp. 127-130.

USPTO Notice of allowance for U.S. Appl. No. 11/450,618 dated Oct. 27, 2009.

Padmanabhan et al., "Multi-Dimensional Clustering: A New Data Layout Scheme in DB2"; ACM, SIGMOD 2003, Jun. 2003 San Diego, CA, pp. 637-641.

USPTO Notice of allowance for U.S. Appl. No. 11/453,515 dated Sep. 1, 2010.

USPTO office action for U.S. Appl. No. 12/125,717 dated Sep. 8, 2010.

USPTO Notice of allowance for U.S. Appl. No. 12/125,717 dated Apr. 15, 2011.

USPTO final office action dated Feb. 23, 2009 regarding U.S. Appl. No. 11/412,554, 9 Pages.

USPTO final office action dated Aug. 5, 2008 regarding U.S. Appl. No. 11/412,554, 10 Pages.

USPTO notice of allowance dated Jul. 29, 2009 regarding U.S. Appl. No. 11/412,554, 8 Pages.

USPTO non-final office action dated Nov. 25, 2011 regarding U.S. Appl. No. 12/115,661, 28 Pages.

USPTO non-final office action dated Jan. 6, 2012 regarding U.S. Appl. No. 12/114,842, 32 Pages.

* cited by examiner

MOVING AND COPYING DEPENDENCIES ALONG WITH SOURCE CODE

BACKGROUND OF THE INVENTION

1. Field of the Invention

The present invention relates generally to data processing, and more particularly to a computer implemented method, apparatus, and computer usable program code for moving dependencies along with source code.

2. Description of the Related Art:

An integrated development environment (IDE) is a set of software tools such as source editors, compilers, and debuggers that are commonly accessible from a single user interface. Many integrated development environments help developers manage the source code of applications using an artifact called a project. Common integrated development environments include Eclipse, JBuilder® and Visual Studio®.

A project defines a compilation unit in which source-code files are stored and may be compiled to produce an executable program. Typically, source files are not self contained because the source files use code elements, such as types, operators, or both that are declared in an external software component, such as a file, project, or library. In each case, a project also includes a reference to the location of the external components to allow the compiler to work properly. The relationship between a project that refers to an external component and the external component itself is called a dependency.

Integrated development environments like Eclipse allow a developer to work with several projects at the same time, providing the developer the ability to move and/or copy files from one project to another. The project from which the files are moved is called the origin project. The project to which the files are moved is called the destination project. Move and copy operations may be performed via the user interface. For example, the developer may use "drag and drop" or "cut, copy, and paste" operations as needed. In some instances, the developer may implement the operations using an application programming interface (API). An application programming interface is an interface that allows an application program that is written in a high-level language to use specific data or functions of the operating system or another program.

Current development environments have an important limitation. They do not take into account the dependencies created by the moved/copied files. Consequently, if a file requires an external reference to be added to the project for it to compile, then the developer will also have to move/copy the external reference to the destination project. Otherwise, the project will not compile. As a result, when a developer uses a current integrated development environment, the developer must manually determine which libraries or projects the moved/copied files depend on and manually recreate these dependencies in the destination project. Manually moving dependencies is time consuming but necessary using current development environments.

SUMMARY OF THE INVENTION

Illustrative embodiments provide a computer implemented method, apparatus, and computer usable program code for moving dependencies along with source code. A set of dependencies are identified for the source code in response to a user moving the source code from an origin project to a destination project. A determination is made whether a number of dependencies from the set of dependencies are present in the destination project. The number of dependencies are added to the destination project in response to the number of dependencies being absent in the destination project.

BRIEF DESCRIPTION OF THE DRAWINGS

The novel features believed characteristic of the illustrative embodiments are set forth in the appended claims. The illustrative embodiments themselves, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
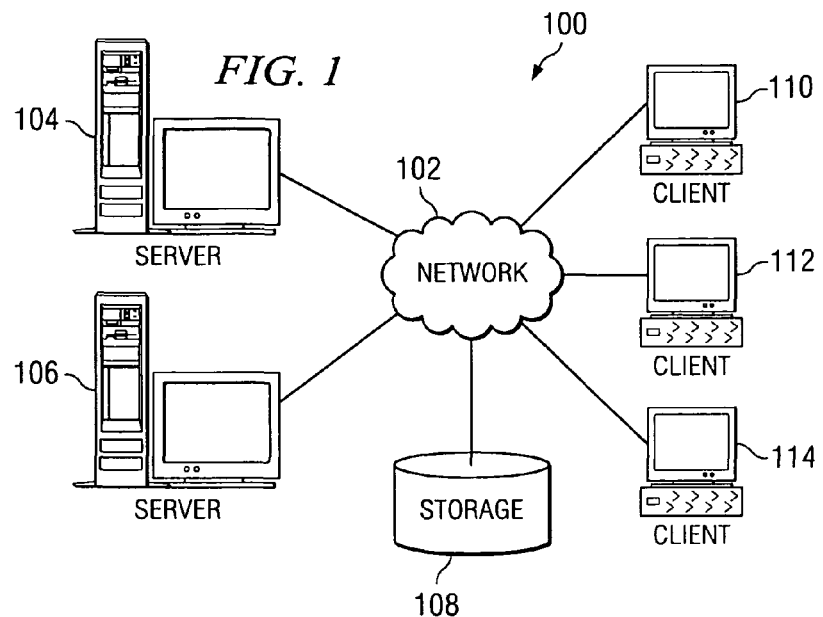
FIG. 1 is pictorial representation of a data processing system in which the illustrative embodiments may be implemented.
Figure 2:
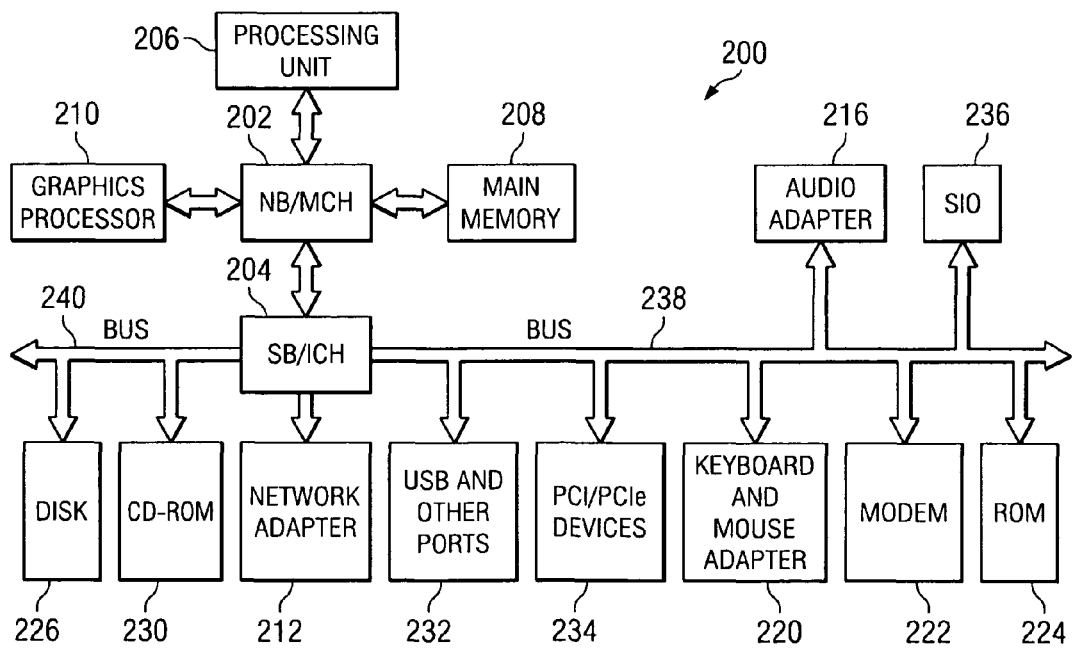
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing -system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Illustrative embodiments provide a computer implemented method, apparatus, and computer usable program code for automatically moving or copying dependencies along with source code. The developer may instead focus on moving source code as well as other development issues without having to manage the external references that may need to be added to the destination project.

A dependency is a reference in a source code or file of a project indicating an external component is necessary for the compiler to perform properly. The relationship between a project that refers to an external component and the external component itself is called a dependency. For example, a source file for a banking application may be dependent on an external library supplying standard accounting procedures.

Figure 3:
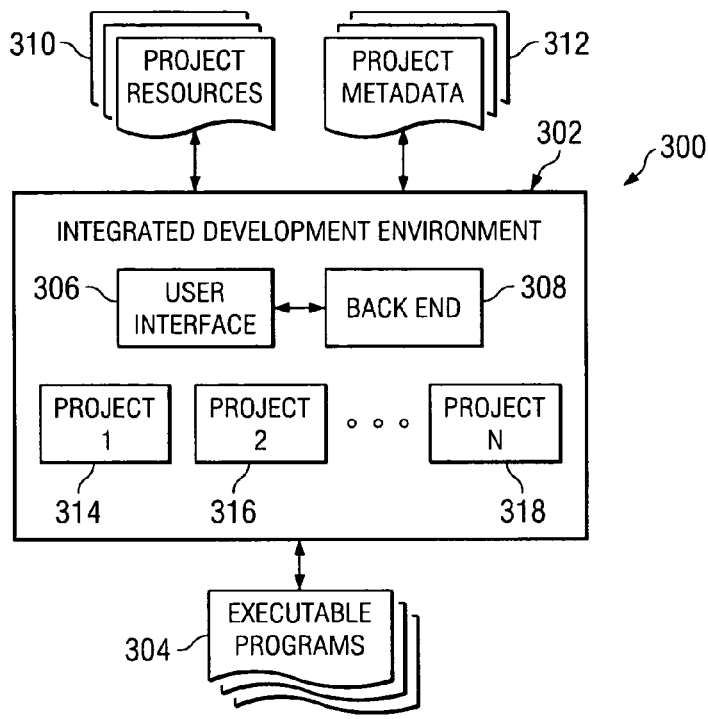
FIG. 3 is a block diagram of an integrated development environment in accordance with the illustrative embodiments.

FIG. 3 is a block diagram of an integrated development environment in accordance with the illustrative embodiments. Development environment 300 is an example of an environment that may be used by a developer for creating and debugging executable programs 304. Development environment 300 may be part of a data processing system, such as data processing system 200 of FIG. 2. Integrated development environment 302 may be stored in a memory and executed using components, such as main memory 208 and processing unit 206 of FIG. 2. Development environment 300 may also be connected to a network, such as network 102 of FIG. 1 in order to access external resources.

Integrated development environment 302 is a programming environment that has been packaged as an application program. Integrated development environment 302 may include a code editor, a compiler, a debugger, and a graphical user interface builder. Integrated development environment 302 may be a standalone application or may be part of one or more existing compatible applications.

In this example, integrated development environment 302 includes user interface 306 and back end 308. User interface 306 is software for allowing a developer to edit source code and otherwise control the overall development environment to create executable programs 304. User interface 306 may include an editor for working with source code and an explorer program to manipulate projects and resources. Back end 308 allows integrated development environment 302 to create executable programs 304. For example, back end 308 may include a compiler for compiling the source code and a linker for linking multiple software components into a single executable program.

In one example, integrated development environment 302 is used to manage project resources 310 and project metadata 312 for project 1 314 and project 2 316 through project N 318. A developer may use integrated development environment 302 to manage any number of projects.

A project defines a compilation unit in which source-code files from project resources 310 are stored and may be compiled to produce an executable program. Typically, source files are not self contained because the source files use code elements, such as types, operators, or both that are declared in an external software component, such as a file, project, or library. For example, project 1 314 includes a reference to the location of the external components in project metadata 312 for allowing the compiler in back end 308 to work properly. The relationship between project 1 314 that refers to an external component in project resources 310 and the external component is called a dependency.

Project resources 310 are the resources used to create project 1 314 and project 2 316 through project N 318. Project resources include folders and files that contain source code. Project metadata 312 is information about a particular project such as a list of the folders and files comprising the project, and a list of dependencies on libraries and other projects.

Figure 4:
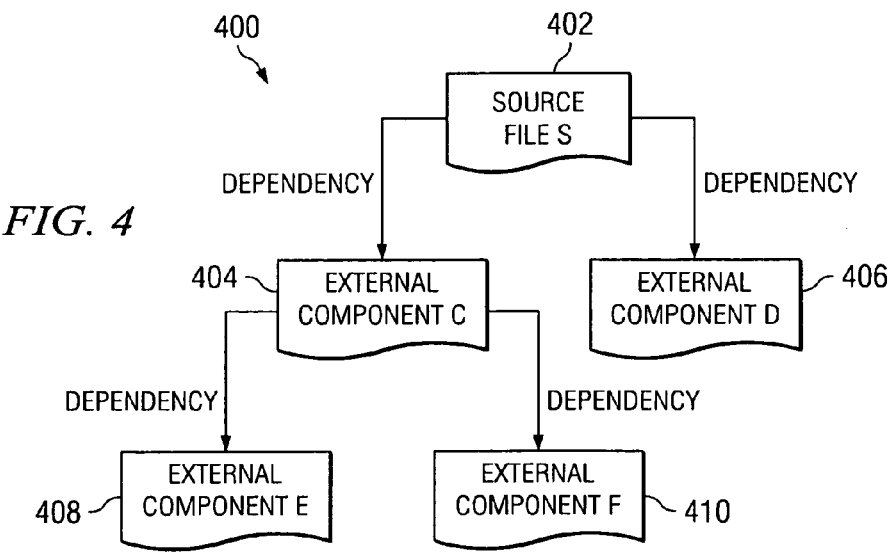
FIG. 4 is an example of a dependency tree in accordance with the illustrative embodiments.

FIG. 4 is an example of a dependency tree in accordance with the illustrative embodiments. Dependency tree 400 describes the dependencies of source file S 402. Source file S 402 includes source code used for a project, such as project 1 314 of FIG. 3. Source file S 402 may be part of project resources, such as project resources 310 of FIG. 3.

Source file S 402 uses code elements, such as types, operators, or both that are declared in external software components. In FIG. 4, source file S 402 includes direct dependencies declared in external component C 404 and external component D 406. External components are external software components including type and operators used by a source file. External components may include, for example, a file, project, library, or similar module for organizing types and operators.

External component D 406 does not depend on other external components. External component C 404 is further dependent on external component E 408 and external component F 410. As a result, a single source file, such as source file S 402, may be dependent on external components not directly linked to source file S 402, such as external component E 408 and external component F 410. Dependency tree 400 is relatively simple in these examples, but one may easily envision a dependency tree with complex dependencies on external components, so that moving and copying the required dependencies along with even a single source file may create significant amounts of painstaking manual work for the developer.

FIGS. 5A-5H illustrates moving dependencies along with source code. Moving as herein defined refers to either moving or copying dependencies. The examples shown in FIGS. 5A-5H may occur in an integrated development environment, such as integrated development environment 302 of FIG. 3. In FIG. 5, origin project P 502 and destination project Q 504 each includes a number of source files. Origin project P 502 and destination project Q 504 may be a project, such as project 1 314, project 2 316, and project N 318 of FIG. 3. Origin project P 502 may include source file E 506 and source file F 508. Destination project Q 504 includes source file x 510 and other source files copied or moved here. Source file E 506, source file F 508, and source file X 510 may be a source file, such as source file-S 402 of FIG. 4 stored in project resources, such as project resources 310 of FIG. 3.

Source file F 508 in origin project P 502 depends on external component C 512, thus requiring origin project P 502 to contain reference R 514 to external component C 512. Source file X 510 may also depend on external component C 512 requiring destination project Q 504 to include reference R 516 to external component C 512 in FIG. 5B. A reference may take the form of the name of a project containing source code or the name of a file containing a library of pre-compiled source code. References R 514 and 516 may be shown by a dependency tree, such as dependency tree 400 of FIG. 4.

In order to automatically move dependencies along with source code, program code within the integrated development environment examines the source code to be moved/copied to determine which dependencies are contributed, examines the destination project to determine what dependencies are already there, adds any missing dependencies to the destination project, and moves/copies the source code to the destination.

Figure 5A:
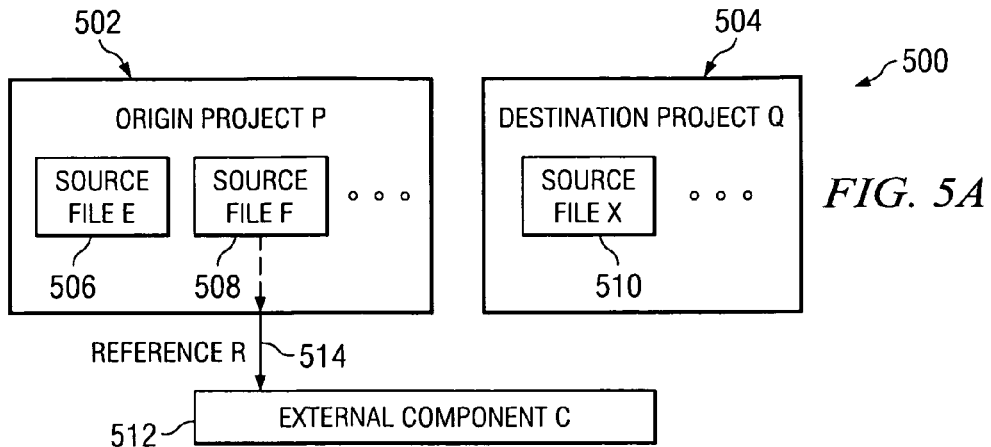
FIGS. 5A-5B are diagrams depicting an example of a copy operation when the destination project did not already contain the required reference in accordance with the illustrative embodiments.
Figure 5B:
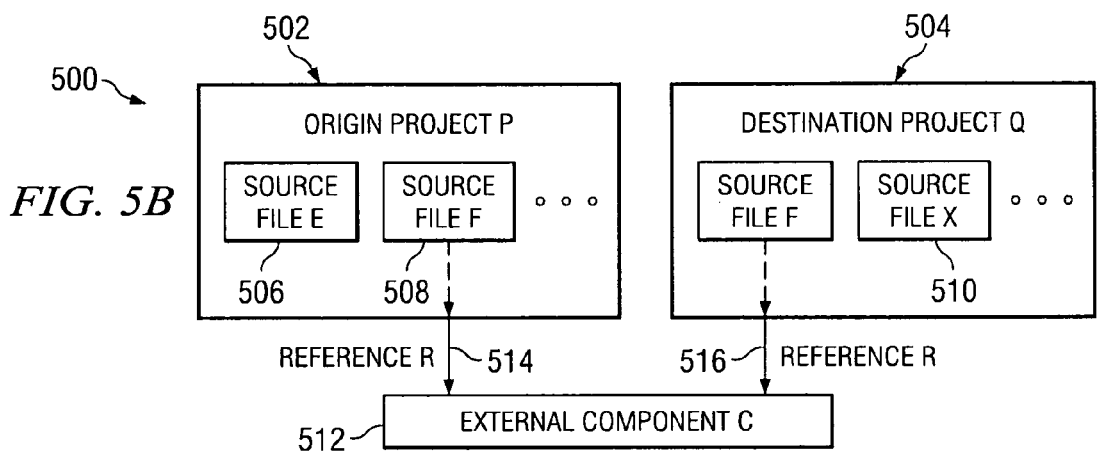

FIGS. 5A-5B are diagrams depicting an example of a copy operation when the destination project did not already contain the required reference in accordance with illustrative embodiments. FIGS. 5A-5B depict operation 500 to copy source file F 508 from origin project P 502 to destination project Q 504 when destination project Q 504 does not already contain the required reference to external component C 512. FIG. 5A shows origin project P 502 and destination project Q 504 before the copy operation and FIG. 5B shows origin project P 502 and destination project Q 504 after the copy operation.

In FIG. 5B, an illustrative embodiment automatically adds reference R 516 to destination project Q 504 when the developer moves source file F 508 from origin project P 502 to destination project Q 504 without an additional action from the developer. As a result, source file F 508 will still compile in destination project Q 504 after being moved. AS previously mentioned, reference R 514 and 516 may refer to a file, project, or library in external component C 512.

Figure 5C:
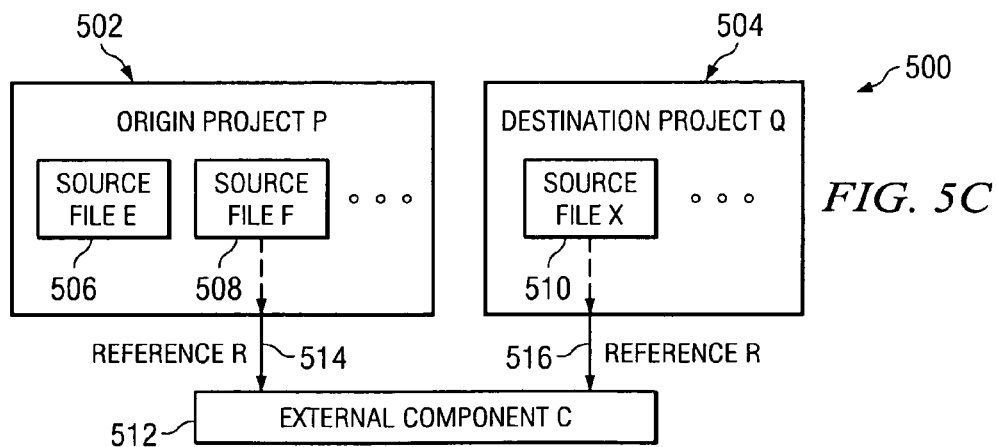
FIGS. 5C-5D are diagrams depicting an example of a copy operation when the destination project already contained the required reference in accordance with the illustrative embodiments.
Figure 5D:
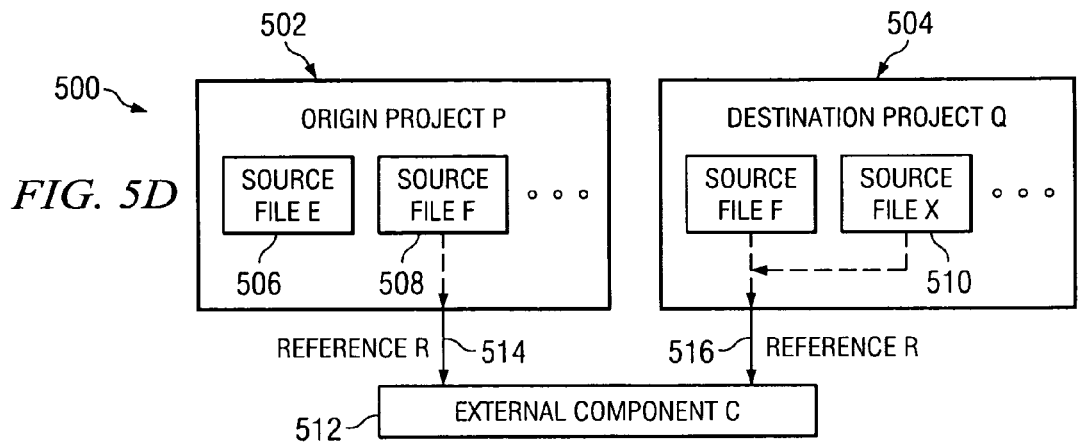

FIGS. 5C-5D are diagrams depicting an example of a copy operation when the destination project already contained the required reference in accordance with the illustrative embodiments. FIGS. 5C-5D depict operation 500 to copy source file F 508 from origin project P 502 to destination project Q 504 when destination project Q 504 already contains required reference R 516 to external component C 512. FIG. 5C shows origin project P 502 and destination project Q 504 before the copy operation, and FIG. 5D shows origin project P 502 and destination project Q 504 after the copy operation. In these examples, the integrated development environment determines that it is not necessary to add another reference R 516 to destination project Q 504. The determination does not require additional action by the developer.

Figure 5E:
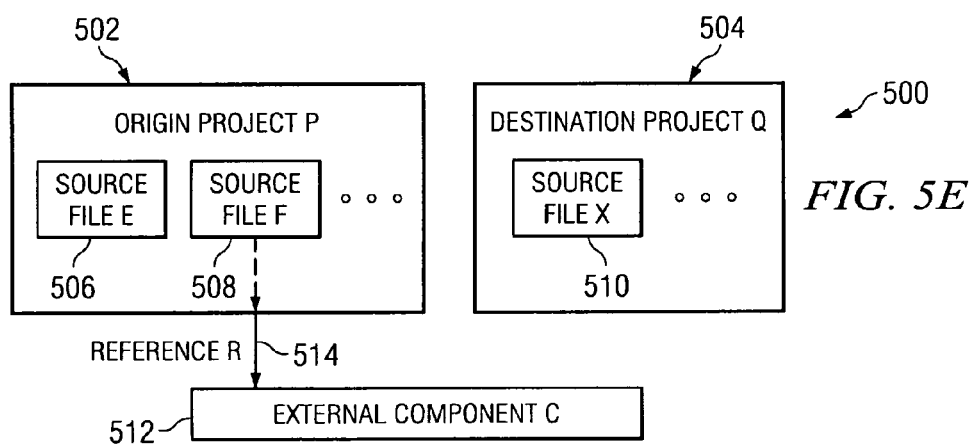
FIGS. 5E-5F are diagrams depicting an example of a move operation when the destination project did not already contain the required reference in accordance with the illustrative embodiments.
Figure 5F:
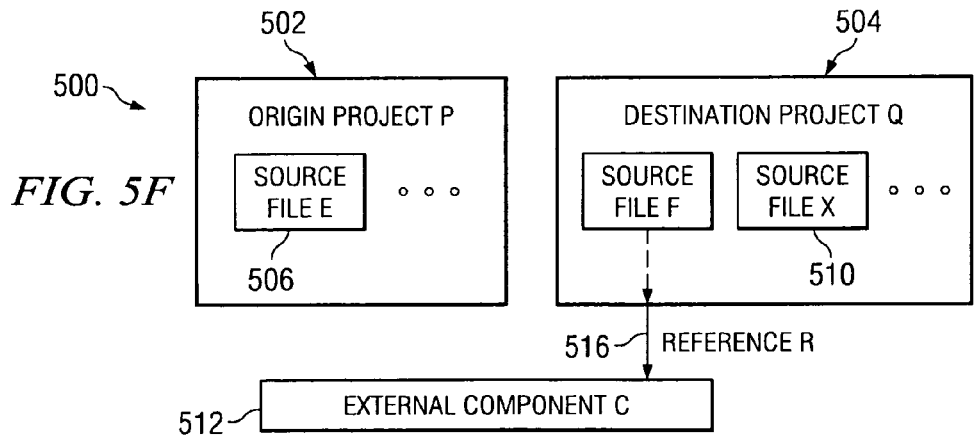

FIGS. 5E-5F are diagrams depicting an example of a move operation when the destination project did not already contain the required reference in accordance with the illustrative embodiments. FIGS. 5E-5F depicts operation 500 to move source file F 508 from origin project P 502 to destination project Q 504 when destination project Q 504 does not already contain required reference R 516 to external component C 512. FIG. 5E shows origin project P 502 and destination project Q 504 before the move operation, and FIG. 5F shows origin project P 502 and destination project Q 504 after the move operation.

In contrast to the copy operation, after the move operation is performed, reference R 514 is deleted from the origin project. Reference R 514 is deleted without additional action by the developer.

Figure 5G:
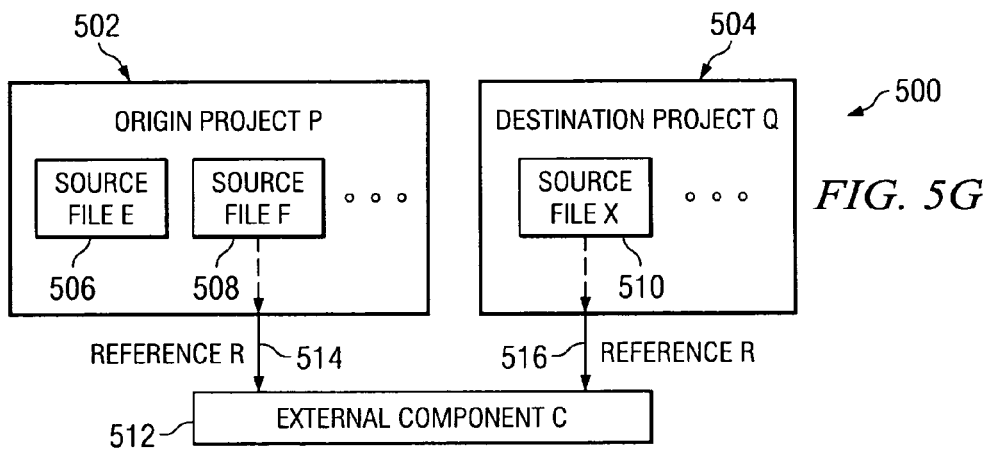
FIGS. 5G-5H are diagrams depicting an example of a move operation when the destination project already contained the required reference in accordance with the illustrative embodiments.
Figure 5H:
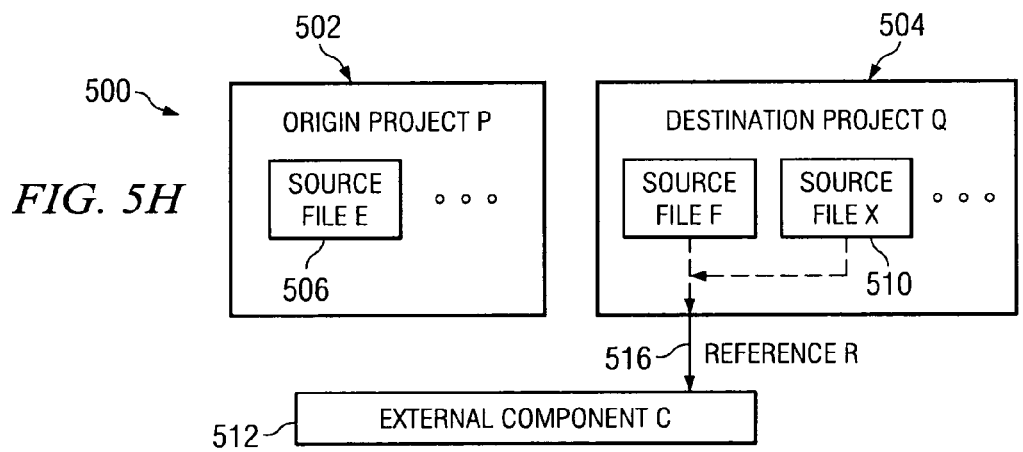

FIGS. 5G-5H are diagrams depicting an example of a move operation when the destination project already contained the required reference in accordance with the illustrative embodiments. FIGS. 5G-5H depicts operation 500 to move source file F 508 from origin project P 502 to destination project Q 504 when destination project Q 504 already contains required reference R 516 to external component C 512. FIG. 5G shows origin project P 502 and destination project Q 504 before the move operation, and FIG. 5H shows origin project P 502 and destination project Q 504 after the move operation.

Figure 6:
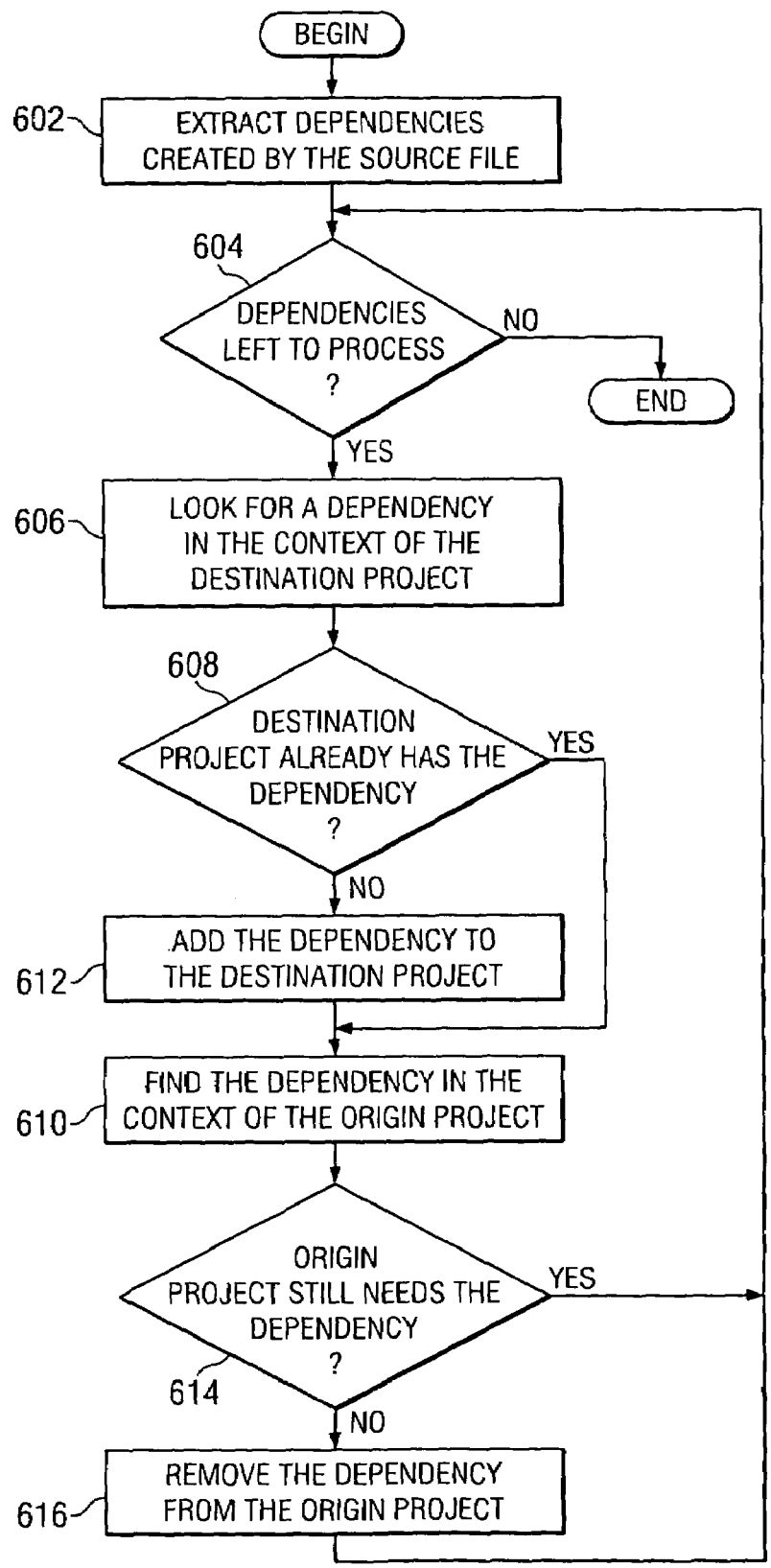
FIG. 6 is a flowchart for a process for moving dependencies along with source code in accordance with the illustrative embodiments.

FIG. 6 is a flowchart for moving dependencies along with source code in accordance with the illustrative embodiments. The process of FIG. 6 may be implemented by an integrated development environment, such as integrated development environment 302 of FIG. 3. The move/copy operation may be an operation, such as operation 500 of FIGS. 5A-5H. The process of FIG. 6 is performed automatically so that the developer does not have to ensure that references, such as references R 514 and 516 are included for each external reference, saving time and effort. The process of FIG. 6 occurs when a user copies or moves a source file or after the copy or move is performed.

The process begins with the integrated development environment extracting dependencies created by the source file (step 602). For example, during step 602, the integrated development environment analyzes the source file contained in the file, such as source file F 508 of FIGS. 5A-5H to detect or identify a set of dependencies to external components, such as external component C 512 of FIGS. 5A-5H. The set of dependencies is one or more dependencies. The process of step 602 may be performed by direct text analysis of the source code or by accessing the abstract syntax tree or dependency tree, such as dependency tree 400 of FIG. 4 if available.

Next, the integrated development environment determines whether there are dependencies left to process (step 604). The determination of step 604 is performed so that a number of dependencies absent from the destination project may be added as needed to the destination project. The number of dependencies are one or more dependencies of the set of dependencies. If there are no dependencies left to process, the process terminates. If the integrated development environment determines there are dependencies left to process in step 604, the integrated development environment looks for a dependency in the context of the destination project (606). The destination project may be a project, such as destination project Q 504 of FIGS. 5A-5H. Step 606 may be performed in a manner similar to step 602 for the destination project.

Next, the integrated development environment determines whether the destination project already has the dependency (step 608). Step 608 is performed to determine what dependencies are already present. If the integrated development environment determines the destination project already has the dependency, the integrated development environment finds the dependency in the context of the origin project (step 610). If the integrated development environment determines the destination project does not already have the dependency in step 608, the integrated development environment adds the dependency to the destination project (step 612) before finding the dependency in the context of the origin project (step 610). Step 612 is performed to add the number of dependencies identified as missing from the destination project. As a result, each missing dependency is added to the destination project so that the project may properly compile.

Next, the integrated development environment determines whether the origin project still needs the dependency (step 614). The determination of step 614 ensures that even if a file is moved or copied, the reference, such as reference R 514 of FIG. 5, is not deleted because the reference is still needed.

If the integrated development environment determines the project does not still need the dependency, the integrated development environment removes the dependency from the origin project (step 616). Next, the process returns again to the determination of step 604. If the integrated development environment determines the origin project still needs the dependency in step 614, the process returns directly to the determination of step 604.

FIG. 6 works recursively on the full tree of dependencies rooted at the origin project not just on the single level of dependencies shown in FIGS. 5A-5H. For example, if the external component, such as external component C 512 of FIGS. 5A-5H depends on another external component, the process creates a reference for both component C and the other external component. The automatic creation of references for dependencies may be used to detect numerous levels of dependencies for an entire dependency tree or to a dependency depth specified by the developer. For example, a developer may be prompted to choose to include a reference for a complete dependency tree or stop at a specified level.

Re-summarizing, the process of FIG. 6 is used to examine the source context to determine what dependences are contributed by the source file to be moved/copied, examine the destination project to determine what dependencies are already there, add any missing dependencies to the destination project, and move or copy the source file to the destination project. The result of the process of FIG. 6 is that the source code is automatically moved and compiles to create the executable program without any additional action by the developer.

Many third-generation programming languages define constructs that allow referencing types and operations defined in other source files. The Java® programming language provides two of them using an import statement at the beginning of the file, such as "import java.util.List" or using a fully qualified type name embedded in other statements, such as "java.util.List.isEmpty( )." Other languages rely on the same concept with different syntaxes: the "with" and "use" keywords in Ada or the "#include, directive in C/C++. In addition, integrated development environments such as Eclipse provide an application programming interface for accessing project data such as source files and project metadata such as references to external components the project depends on.

Thus, the illustrative embodiments provide for automatically moving and/or copying dependencies along with source code. The illustrative embodiments increase developer productivity. The developer is able to focus on moving and/or copying source code without having to manage the external references that may need to be added to the destination project, saving time and money and increasing developer efficiency.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for moving dependencies along with source code, the computer implemented method supporting a software project using a user interface of an integrated development environment, the method comprising:
   concurrently displaying for user interaction within a dual project view, an origin project comprising a first plurality of files and a destination project comprising at least a second plurality of files, whereby a source file from the first plurality of files of the origin project can be interactively moved over to the second plurality of files of the destination project, wherein the second plurality of files can be a subset of the first plurality of files;
   responsive to the event of a user moving a source code file from the origin project to the destination project represented in the dual project view, identifying, by an underlying process of the integrated development environment operative to respond to the moving, a set of dependencies for the source code file from the origin project using information of a source files dependency tree;
   determining, by the underlying process, whether a number of dependencies from the set of dependencies of the origin project are already present in the destination project, wherein the number of dependencies depend from at least one component external to the source code file, the at least one component being necessary for a compiler to compile the source code file;
   responsive to the number of dependencies being absent in the destination project, automatically adding, by the background process, the number of dependencies to the destination project without adding an entirety of the set of dependencies, thereby obviating manual adding or additional retrieval of the number of dependencies by the user.

2. The computer implemented method of claim 1, further comprising:
   determining whether the origin project still needs the number of dependencies; and
   responsive to determining the origin project does not need the number of dependencies, removing the number of dependencies from the origin project.

3. The computer implemented method of claim 1, wherein each of the set of dependencies is a reference to an external component.

4. The computer implemented method of claim 1, wherein the external component is any of a file, library, and project.

5. The computer implemented method of claim 1, wherein the identifying step further comprises:
   performing direct text analysis of the source code.

6. The computer implemented method of claim 1, wherein the identifying step further comprises:
   accessing an abstract syntax tree.

7. The computer implemented method of claim 1, wherein the identifying step occurs responsive to the user copying the source code from the origin project to the destination project.

8. The computer implemented method of claim 1, wherein the identifying step further comprises:
   examining a source context of a source file to determine which of the set of dependencies are contributed by the source file.

9. The computer implemented method of claim 1, wherein the determining step further comprises:
   examining a target context of the destination project to determine which of the number of dependencies are already present in the destination project.

10. A system comprising:
    a processor for processing an operating system and an integrated development environment; and
    a storage operably connected to the processor for storing the operating system and the integrated development environment wherein the operating system and the integrated development environment may be loaded into a main memory for execution by the processor, wherein the integrated development environment concurrently displays for user interaction within a dual project view, an origin project comprising a first plurality of files and a destination project comprising at least a second plurality of files, whereby a source file from the first plurality of files of the origin project can be interactively moved over to the second plurality of files of the destination project, wherein the second plurality of files can be a subset of the first plurality of files; responsive to the event of a user moving a source code file from the origin project to the destination project represented in the dual project view, identifies, by an underlying process of the integrated development environment operative to respond to the moving, a set of dependencies for the source code file from the origin project using information of a source files dependency tree; determines, by the underlying process, whether a number of dependencies from the set of dependencies of the origin project are already present in the destination project, wherein the number of dependencies depend from at least one component external to the source code file, the at least one component being necessary for a compiler to compile the source code file; and responsive to the number of dependencies being absent in the destination project, automatically adds, by the background process, the number of dependencies to the destination project without adding an entirety of the set of dependencies, thereby obviating manual adding or additional retrieval of the number of dependencies by the user.

11. The system of claim 10, wherein each of the set of dependencies is a reference to an external component.

12. The system of claim 11, wherein the external component is any of a file, library, and project.

13. The system of claim 10, wherein the integrated development environment examines the source code in response to the user copying the source code from the origin project to the destination project.

14. A computer program product comprising a computer usable medium including computer usable program code for moving dependencies along with source code, the computer program product supporting a software project using a user interface of an integrated development environment, the method comprising:
   computer usable program code for concurrently displaying for user interaction within a dual project view, an origin project comprising a first plurality of files and a destination project comprising at least a second plurality of files, whereby a source file from the first plurality of files of the origin project can be interactively moved over to the second plurality of files of the destination project, wherein the second plurality of files can be a subset of the first plurality of files
   computer usable program code responsive to the event of a user moving a source code file from the origin project to the destination project represented in the dual project view, for identifying, by an underlying process of the integrated development environment operative to respond to the moving, a set of dependencies for the source code file from the origin project using information of a source files dependency tree;
   computer usable program code for determining, by the underlying process, whether a number of dependencies from the set of dependencies of the origin project are already present in the destination project, wherein the number of dependencies depend from at least one component external to the source code file, the at least one component being necessary for a compiler to compile the source code file; and
   computer usable program code responsive to the number of dependencies being absent in the destination project, for automatically adding, by the background process, the number of dependencies to the destination project without adding an entirety of the set of dependencies, thereby obviating manual adding or additional retrieval of the number of dependencies by the user.

15. The computer program product of claim 14, further comprising:
   computer usable program code for determining whether the origin project still needs the number of dependencies; and
   computer usable program code responsive to determining the origin project does not need the number of dependencies, for removing the number of dependencies from the origin project.

16. The computer program product of claim 14, further comprising:
   computer usable program code for determining whether the origin project still needs the set of dependencies;
   computer usable program code responsive to determining the origin project does not need the set of dependencies, for removing the dependencies from the origin project.

17. The computer program product of claim 14, wherein the computer usable program code for identifying further comprises:
   computer usable program code for performing direct text analysis of the source code.

18. The computer program product of claim 14, wherein the computer usable program code for identifying further comprises:
   computer usable program code for accessing an abstract syntax tree.

19. The computer program product of claim 14, wherein the computer usable program code for identifying further comprises:
   computer usable program code for examining a source context of the source file to determine which of the set of dependencies are contributed by the source file.

20. The computer program product of claim 14, wherein the computer usable program code for determining further comprises:
   computer usable program code for examining a target context of the destination project to determine which of the number of dependencies are already present in the destination project.

* * * * *